United States Patent
Li et al.

(10) Patent No.: US 9,310,913 B2
(45) Date of Patent: Apr. 12, 2016

(54) ELECTRONIC DEVICE AND WATERPROOF TOUCH MODULE THEREOF

(71) Applicant: GETAC TECHNOLOGY CORPORATION, Hsinchu County (TW)

(72) Inventors: Chun-Hsing Li, Taipei (TW); Cheng-Hung Chiang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 14/474,058

(22) Filed: Aug. 29, 2014

(65) Prior Publication Data
US 2015/0293619 A1    Oct. 15, 2015

(30) Foreign Application Priority Data

Apr. 10, 2014  (CN) .......................... 2014 1 0142675

(51) Int. Cl.
*G06F 3/041*    (2006.01)

(52) U.S. Cl.
CPC ...... *G06F 3/041* (2013.01); *G06F 2203/04103* (2013.01)

(58) Field of Classification Search
CPC ................. G06F 3/0416; G06F 3/041; G06F 2203/04101; G06F 2203/04808; G06F 3/0412; G06F 3/04883; G06F 3/0488; G06F 2203/04104; G06F 3/044
See application file for complete search history.

(56) References Cited

U.S. PATENT DOCUMENTS

| | | | | |
|---|---|---|---|---|
| 5,943,044 A | * | 8/1999 | Martinelli | G06F 3/03547 178/18.01 |
| 6,757,002 B1 | * | 6/2004 | Oross | G06F 3/03547 345/173 |
| 8,213,166 B2 | * | 7/2012 | Mihara | G06F 1/1616 345/160 |
| 2011/0304961 A1 | * | 12/2011 | Lin | G06F 1/169 361/679.01 |
| 2012/0098755 A1 | * | 4/2012 | Lin | G06F 3/044 345/173 |

FOREIGN PATENT DOCUMENTS

| | | |
|---|---|---|
| TW | M281224 | 11/2005 |
| TW | M291184 | 5/2006 |

* cited by examiner

*Primary Examiner* — Olga Merkoulova

(57) ABSTRACT

Disclosed are an electronic device and a waterproof touch module of the electronic device. The electronic device includes a casing and the waterproof touch module, and an installing portion is formed on a surface of the casing. The waterproof touch module includes a touch unit, an adhesive and a waterproof plate, and the touch unit is installed at the installing portion, and the waterproof plate is attached onto a surface of the casing through the adhesive and covered onto the touch unit, so that the touch unit is sealed in the installing portion to achieve a good waterproof effect.

19 Claims, 4 Drawing Sheets

ELECTRONIC DEVICE AND WATERPROOF TOUCH MODULE THEREOF

FIELD OF THE INVENTION

The present invention relates to a touch module, and more particularly to an electronic device and a waterproof touch module of the electronic device.

BACKGROUND OF THE INVENTION

As science and technology advance rapidly, electronic devices gradually become an indispensable part of our daily life and they are used extensively in different areas such as the applications in military, office, everyday life, etc. At present, the use of touch electronic devices is the mainstream, and the touch electronic devices include but not limiting to notebook computers, handwriting pads, touch screens, etc. The touch electronic device generally includes a touch module, so that users may slide or press the touch module to input or retrieve data of the electronic device.

In a conventional touch module, a slide unit and a press unit are manufactured separately, and then they are assembled and combined with each other without any waterproof structure.

As the using time of the electronic device becomes increasingly longer, and users often carry the electronic device with them all the time, some manufacturers provides a waterproof electronic device by gluing the interior of the touch module or installing a rubber structure to prevent damages caused by rain or water splashing while carrying the electronic device. As a result, the thickness of the electronic device is increased by 3 mm to 4 mm, not just increasing the volume of the electronic device only, but also incurring a higher material cost. Obviously, such conventional electronic device requires further improvements.

SUMMARY OF THE INVENTION

Therefore, it is a primary objective of the present invention to provide an electronic device and a waterproof touch module thereof, wherein an adhesive is provided for attaching a waterproof plate onto a surface of a casing and covering the waterproof plate onto a touch unit, so that the touch unit is sealed in an installing portion to achieve a good waterproof effect.

To achieve the aforementioned objective, the present invention provides an electronic device, comprising a casing and a waterproof touch module. The casing has an installing portion formed on a surface of the casing, and the waterproof touch module comprises a touch unit, an adhesive and a waterproof plate, and the touch unit is installed at the installing portion, and the waterproof plate is attached onto a surface of the casing through the adhesive and covered onto the touch unit, such that the touch unit is sealed in the installing portion.

To achieve the aforementioned objective, the present invention further provides a waterproof touch module used in an electronic device, and the electronic device comprises a casing, and the waterproof touch module comprises an installing portion, a touch unit, an adhesive and a waterproof plate, wherein an installing portion is disposed on a surface of the casing, and the touch unit is installed at the installing portion, and the waterproof plate is attached onto a surface of the casing through the adhesive and covered onto the touch unit, such that the touch unit is sealed in the installing portion.

The present invention has the following advantages and effects:

1. The waterproof plate seals the touch unit in the installing portion of the casing to achieve the effects of saving the material cost of the waterproof touch module and reducing the volume of the electronic device.

2. Since the waterproof plate is a component generally made of a polyester film material, therefore the waterproof plate has high extensibility and produces a stroke similar to that of pressing a press button when the press block is pressed.

3. The adhesive has a hollow area configured to be corresponsive to the press block of the waterproof plate, so that when users press the press block of the waterproof plate, a hand feel of pressing a press button is produced to reduce the level of discomfort of the use and comply with a user's using habit, so as to improve the comfortability of the use.

DESCRIPTION OF THE PREFERRED EMBODIMENTS

Figure 1:
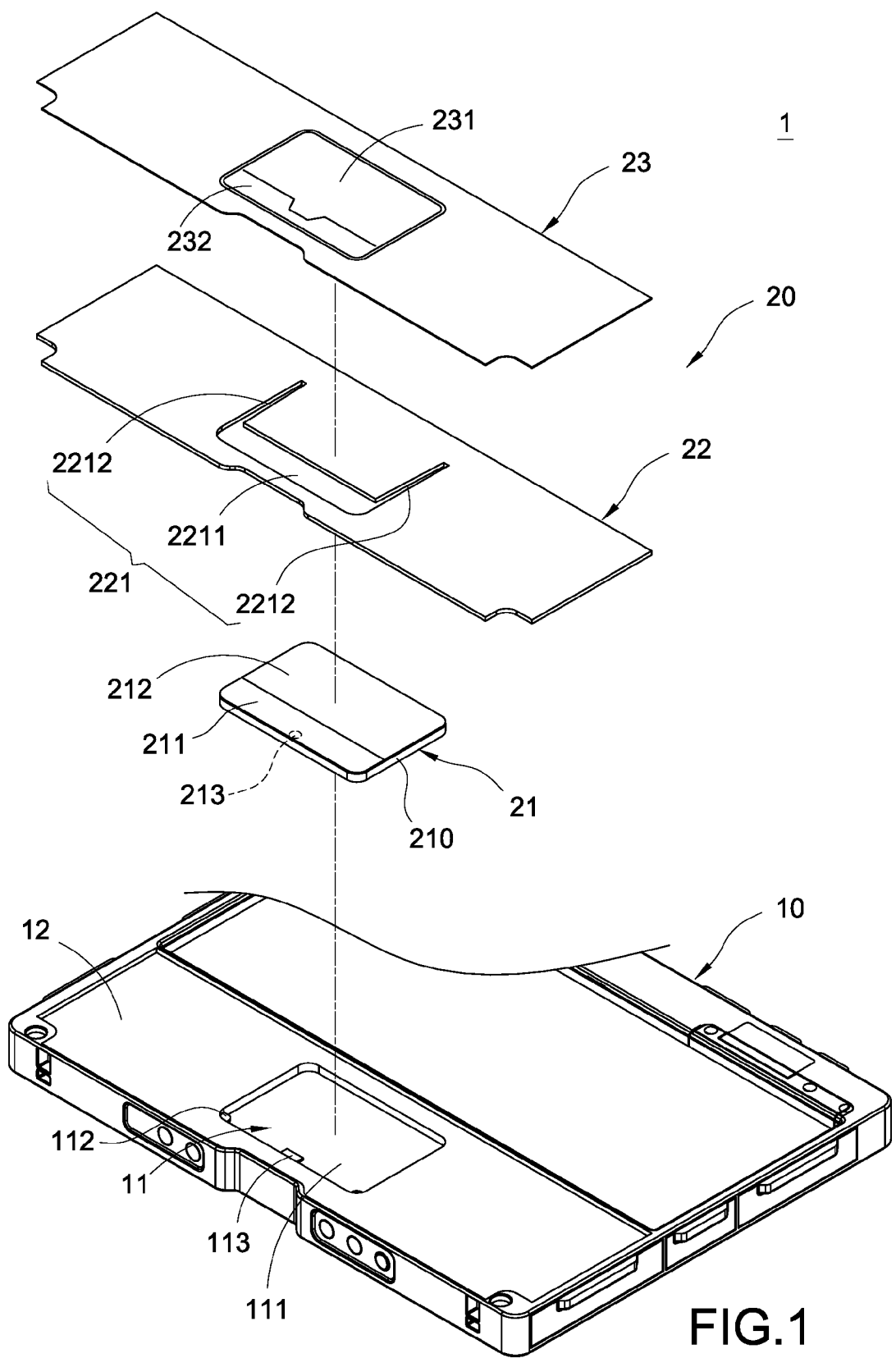
FIG. 1 is an exploded view of an electronic device of the present invention.

The technical contents of the present invention will become apparent with the detailed description of preferred embodiments accompanied with the illustration of related drawings as follows. It is noteworthy that same numerals are used for representing same respective elements in the drawings.

Figure 2:
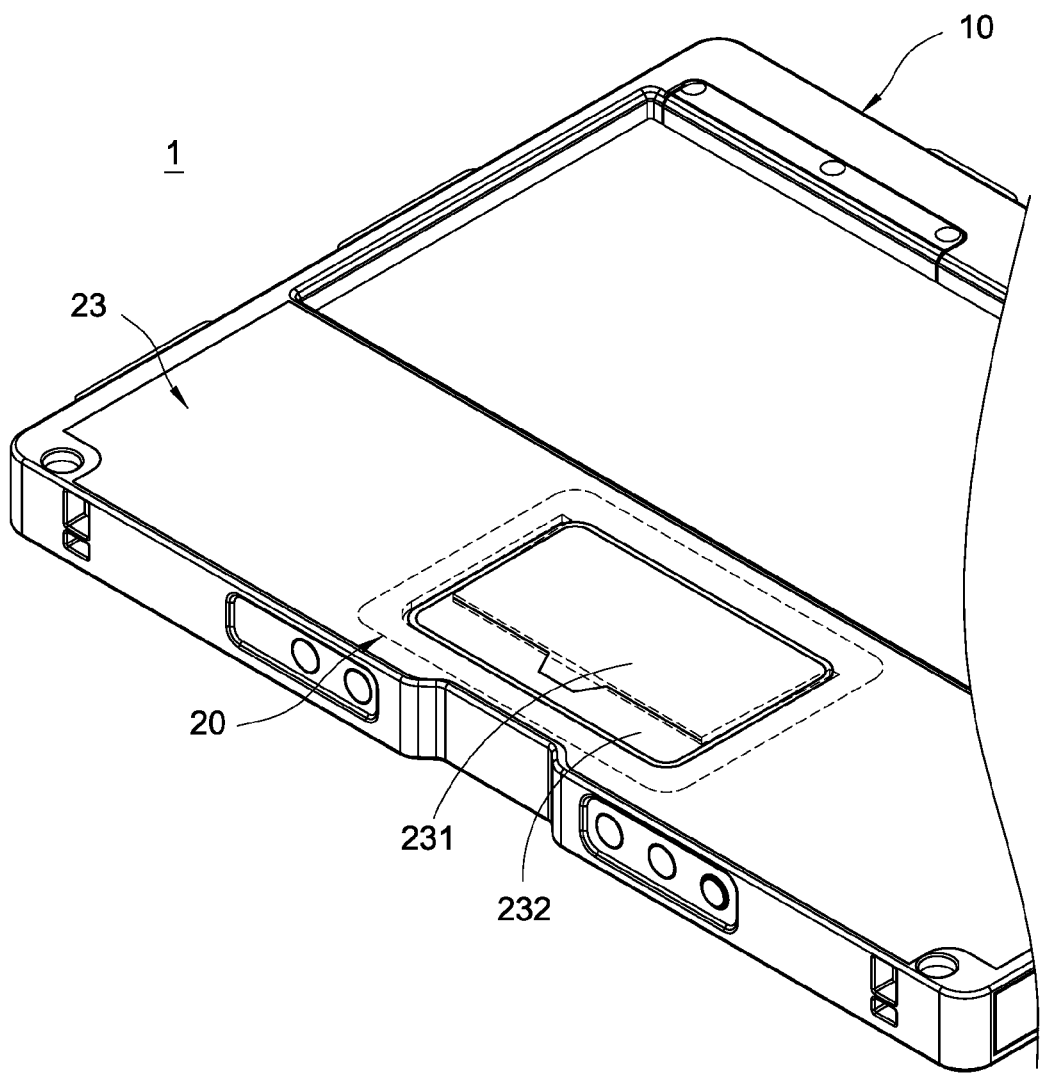
FIG. 2 is a perspective view of an electronic device of the present invention.
Figure 3:
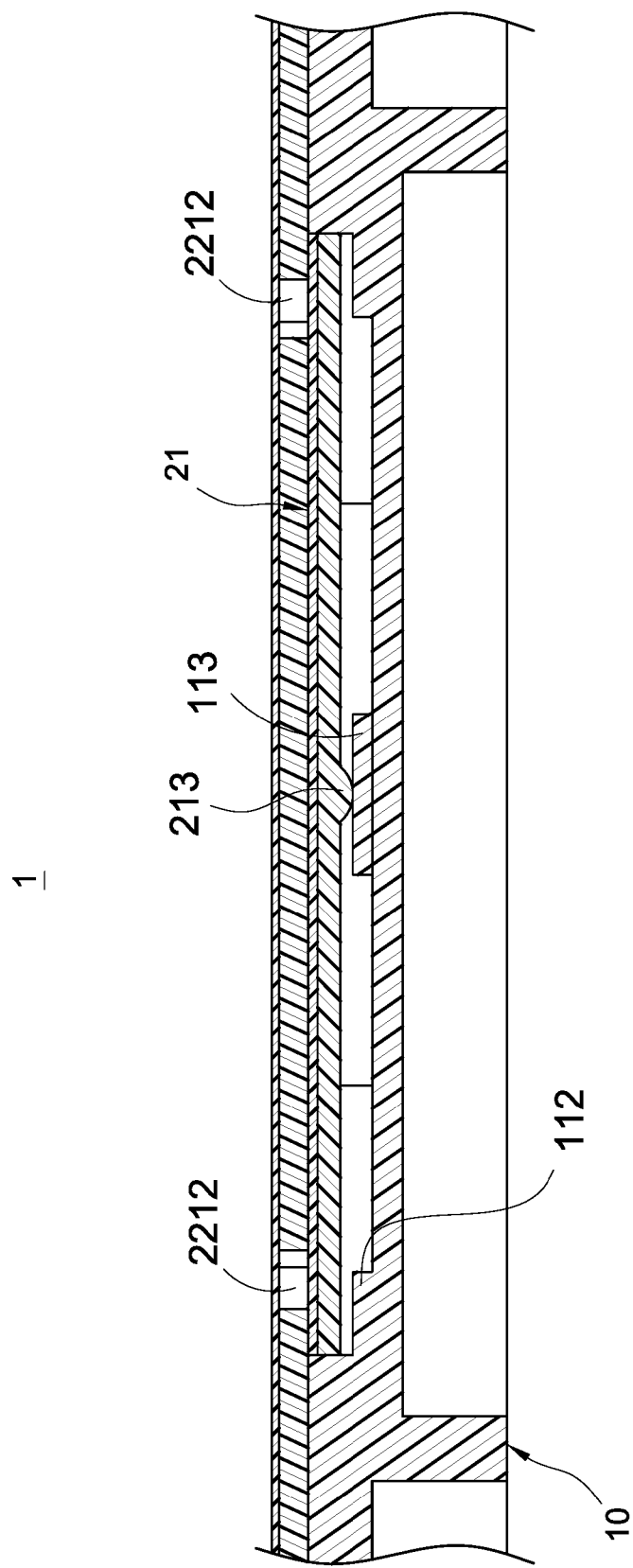
FIG. 3 is a cross-sectional view of an electronic device of the present invention.

With reference to FIGS. 1 to 3 for an exploded view, a perspective view and a cross-sectional view of an electronic device of the present invention respectively, the electronic device 1 comprises a casing 10 and a waterproof touch module 20.

The electronic device 1 includes but not limiting to a notebook computer, a handheld electronic device, a handwriting pad, a touch panel, etc.

The casing 10 has an installing portion 11 formed on a surface of the casing 10. The installing portion 11 is disposed in an accommodating slot 111 at a middle position of the front of the casing 10, and the accommodating slot 111 is substantially in a rectangular shape, but the invention is not limited to this shape only. The casing 10 further has a recess area 12 disposed at a position corresponding to the external periphery of the accommodating slot 111, so that the accommodating slot 111 is formed at the middle position of the recess area 12. In addition, a stopper 112 is formed separately at the left and right corners of the front side of the accommodating slot 111, and a protrusion 113 is formed at the middle position of the front of the accommodating slot 111. The casing 10 is a metal component, a plastic component, or a component made of other materials.

The waterproof touch module 20 comprises a touch unit 21, an adhesive 22 and a waterproof plate 23.

The touch unit 21 is embedded and fixed into the accommodating slot 111 of the casing 10. The touch unit 21 comprises a circuit board 210 and a slide area 212 and a press area 211 disposed on a surface of the circuit board 210. The press area 211 of the touch unit 21 is disposed on a side of the slide area 212 of the touch unit 21. The touch unit 21 is integrally formed touch unit. The touch unit 21 achieves the effect of dividing the two areas (which are the slide area 212 and the press area 211) by software and/or firmware. In addition, the circuit board 210 has a hemispherical bump 213 formed at a middle position of the front of the rear side of the circuit board 210, such that when the touch unit 21 is installed in the accommodating slot 111, the bump 213 presses at the protrusion 113, and the electronic device 1 can determine whether it is a left press button or a right press button when the touch unit 21 is pressed. The touch unit 21 includes a control unit and a touch electronic circuit (not shown in the figure), wherein the control unit is provided for controlling the operation, and it may be a controller, an IC or a chip, and the touch electronic circuit is electrically coupled to the control unit, and the touch unit 21 includes a capacitive touch (multi-point touch) mode, a resistive touch (single-point touch) mode or an optical touch mode.

The adhesive 22 has a hollow area 221. The hollow area 221 has a first through groove 2211 and a pair of second through grooves 2212. The second through grooves 2212 of the hollow area 221 are communicated with both ends of the first through groove 2211 of the hollow area 221 respectively. The first through groove 2211 of the hollow area 221 and each second through groove 2212 of the hollow area 221 substantially form a U-shape. The adhesive 22 is a plastic component, a foam component, a rubber component, etc, but the invention is not limited to these arrangements only.

The waterproof plate 23 is attached on a surface of the casing 10 by the adhesive 22 and covered onto the touch unit 21, such that the touch unit 21 is sealed into the accommodating slot 111 of the casing 10. The waterproof plate 23 is attached onto the bottom of the recess area 12 of the casing 10 by the adhesive 22. The waterproof plate 23 has a slide block 231 and a press block 232. The slide block 231 is disposed on a surface of the waterproof plate 23 and configured to be corresponsive to the slide area 212 of the touch unit 21 and the press block 232 is configured to be corresponsive to the press area 211 of the touch unit 21. The first through groove 2211 of the adhesive 22 is configured to be corresponsive to the press block 232. The second through grooves 2212 are formed on both sides of the slide block 231 respectively. The waterproof plate 23 is a component made of a polyester film material. The waterproof plate 23 has a thickness equal to the thickness of the adhesive 22, or the thickness of the waterproof plate 23 may be greater than or smaller than the thickness of the adhesive 22. The thickness of the waterproof plate 23 is approximately equal to 0.5 mm, but the invention is not limited to such thickness only.

In the assembling process, the touch unit 21 is embedded and fixed into the accommodating slot 111 of the casing 10 first, and then the adhesive 22 is attached onto the recess area 12 of the casing 10 to cover the touch unit 21, and finally the waterproof plate 23 is attached onto a surface of the casing 10 by the adhesive 22 and covered onto the touch unit 21.

Since the waterproof plate 23 is made of a polyester film material which has a good waterproof effect, therefore the waterproof effect of the waterproof plate 23 for the touch unit 21 is improved to achieve the effects of saving the material cost of the waterproof touch module and reducing the volume of the electronic device 1.

Preferably, the waterproof plate 23 is made of a polyester film material having a good extensibility, therefore the waterproof plate 23 has a good extensibility too, and a stroke similar to that of pressing a press button is produced when the press block 232 of the waterproof plate 23 is pressed.

Preferably, the adhesive 22 has a hollow area 221 formed thereon and configured to be corresponsive to the press block 232 of the waterproof plate 23, so that when a user presses the press block 232 of the waterproof plate 23, the design of the hollow area 221 of the adhesive 22 produces a hand feel of pressing the press button, so as to reduce the user's discomfort of the use and comply with the user's using habit, and improve the comfort of use.

Figure 4:
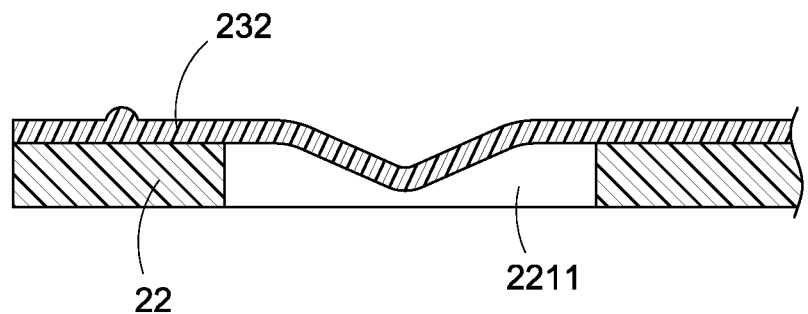
FIG. 4 is a cross-sectional view of a waterproof plate and an adhesive of the present invention.
Figure 5:
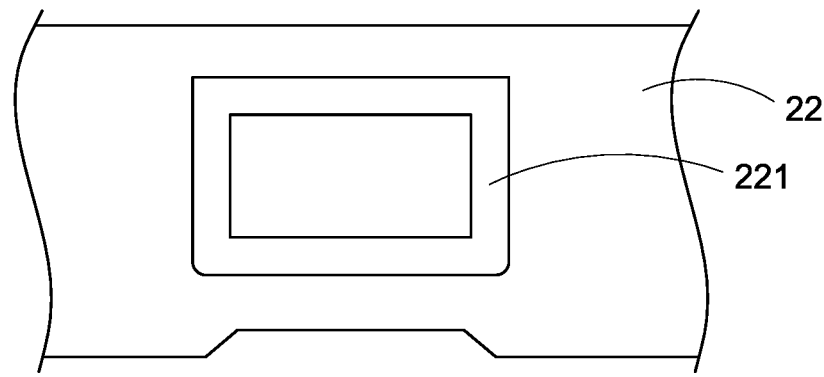
FIG. 5 is a schematic view showing a partial area of the adhesive of the present invention.
Figure 6:
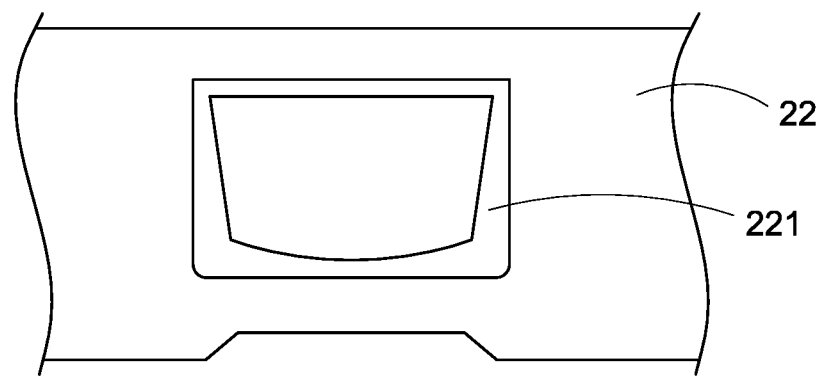
FIG. 6 is a schematic view showing a partial area of the adhesive of another preferred embodiment of the present invention.

With reference to FIGS. 4 to 6, the press block 232 of the waterproof plate 23 is configured to be corresponsive to the first through groove 2211 of the hollow area 221 of the adhesive 22, so that when a user presses the press block 232, the waterproof plate 23 at the top of the first through groove 2211 is deformed to form an inverted triangular recession (as shown in FIG. 4). Since the touch unit 21 adopts the seesaw principle (as shown in FIG. 3), therefore a triangular suspension is formed while pressing the touch unit 21. If a whole-surface adhesive is adopted, the adhesive will have no hollow area, and it will become relatively more difficult to press the touch unit 21. Therefore, the present invention provides a hollow design of the adhesive at the triangular suspension on both sides to give an obvious stroke of pressing the adhesive without being limited by the thickness of the adhesive 22, so as to improve the level of recognition of the stroke of the press button. In addition, the hollow area 221 of the adhesive 22 may be in a hollow square shape as shown in FIG. 5, wherein the groove width on both lateral sides is equal to the groove width at the bottom side. In addition, the hollow area 221 of the adhesive 22 may be in another hollow square shape as shown in FIG. 6, wherein the groove width on both lateral sides is tilted and upwardly tapered, and the groove width at the bottom side is inwardly curved and tapered.

Preferably, the waterproof plate 23 is a component made of a polyester film material which has a good thermal insulation effect, so that the waterproof plate 23 has a good thermal insulation effect, and the electronic device 1 has a good thermal insulation effect, too.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. An electronic device comprising:
   a casing, having an installing portion formed on a surface of the casing, wherein the installing portion comprises a surface having an accommodating slot formed therein; and
   a waterproof touch module, comprising:
      a touch unit, installed in the accommodating slot, the touch unit comprising a slide area and a press area, wherein the press area is disposed on a side of the slide area;
      an adhesive layer disposed over the surface of the casing and the slide area of the touch unit, wherein the adhesive layer comprises a hollow area comprising a first through groove exposing the press area of the touch unit; and
      a waterproof plate, attached onto the surface of the casing and the touch unit by the adhesive layer, the waterproof plate covering the touch unit such that the touch unit is sealed in the installing portion.

2. The electronic device of claim 1, wherein the touch unit is embedded and fixed into the accommodating slot.

3. The electronic device of claim 1, wherein the casing has a recess area formed thereon, and the installing portion is disposed at a middle position of the recess area, and the waterproof plate is attached onto the bottom of the recess area by the adhesive layer.

4. The electronic device of claim 1, wherein a surface of the waterproof plate has a slide block, and the slide block is shaped to correspond to the slide area, and a surface of the waterproof plate has a press block, and the press block is shaped to correspond to the press area.

5. The electronic device of claim 4, wherein the first through groove is shaped to correspond to the press block.

6. The electronic device of claim 4, wherein the hollow area further comprises a pair of second through grooves respectively extending from ends of the first through groove.

7. The electronic device of claim 6, wherein the first through groove is shaped to correspond to the press block.

8. The electronic device of claim 7, wherein the pair of second through grooves are disposed on sides of the slide block respectively.

9. The electronic device of claim 6, wherein the first through groove and the pair of second through grooves substantially form a U-shape.

10. The electronic device of claim 5, wherein the first through groove is substantially in a rectangular shape.

11. A waterproof touch module, applied in an electronic device having a casing, comprising:
   an installing portion, disposed on a surface of the casing, wherein the installing portion comprises a surface having an accommodating slot formed therein;
   a touch unit, installed in the accommodating slot, the touch unit comprising a slide area and a press area, wherein the press area is disposed on a side of the slide area;
   an adhesive layer disposed over the surface of the casing and the slide area of the touch unit, wherein the adhesive layer comprises a hollow area comprising a first through groove exposing the press area of the touch unit; and
   a waterproof plate, attached onto the surface of the casing and the touch unit by the adhesive layer, the waterproof plate covering the touch unit such that the touch unit is sealed in the installing portion.

12. The waterproof touch module of claim 11, wherein the touch unit is embedded and fixed into the accommodating slot.

13. The electronic device of claim 11, wherein a surface of the waterproof plate has a slide block, and the slide block is shaped to correspond to the slide area, and a surface of the waterproof plate has a press block, and the press block is shaped to correspond to the press area.

14. The waterproof touch module of claim 13, wherein the first through groove is shaped to correspond to the press block.

15. The waterproof touch module of claim 13, wherein the hollow area further comprises a pair of second through grooves respectively extending from ends of the first through groove.

16. The waterproof touch module of claim 15, wherein the first through groove is shaped to correspond to the press block.

17. The waterproof touch module of claim 16, wherein the pair of second through grooves are shaped to correspond to sides of the slide block respectively.

18. The waterproof touch module of claim 15, wherein the first through groove and the pair of second through grooves substantially form a U-shape.

19. The waterproof touch module of claim 15, wherein the first through groove is substantially in a rectangular shape.

* * * * *